United States Patent
Kudelski et al.

(10) Patent No.: US 7,890,770 B2
(45) Date of Patent: Feb. 15, 2011

(54) METHOD FOR DEACTIVATING AND REACTIVATING SECURITY MODULES

(75) Inventors: Henri Kudelski, Chexbres (CH); Olivier Brique, Le Mont-sur-Lausanne (CH); Christian Wirz, Lausanne (CH); Patrick Hauert, Lausanne (CH)

(73) Assignee: Nagravision S.A., Chesaux-sur-Lausanne (CH)

( * ) Notice: Subject to any disclaimer, the term of this patent is extended or adjusted under 35 U.S.C. 154(b) by 1570 days.

(21) Appl. No.: 11/212,904

(22) Filed: Aug. 29, 2005

(65) Prior Publication Data
US 2006/0005262 A1  Jan. 5, 2006

(51) Int. Cl.
*G06F 21/00* (2006.01)
*H04N 7/167* (2006.01)
(52) U.S. Cl. ................... 713/191; 726/27; 380/239
(58) Field of Classification Search ............... 713/191; 726/26, 27; 380/247, 255, 270; 725/25, 725/31; 455/558
See application file for complete search history.

(56) References Cited

U.S. PATENT DOCUMENTS

| | | | |
|---|---|---|---|
| 3,731,076 A | 5/1973 | Nagata et al. | |
| 5,379,344 A | 1/1995 | Larsson et al. | |
| 5,682,031 A | 10/1997 | Geronimi | |
| 5,923,884 A * | 7/1999 | Peyret et al. | 717/167 |
| 2003/0146277 A1 * | 8/2003 | Tanabiki et al. | 235/380 |
| 2003/0200406 A1 * | 10/2003 | Kouno | 711/164 |

FOREIGN PATENT DOCUMENTS

| | | |
|---|---|---|
| DE | 19941550 | 3/2001 |
| EP | 0713188 | 5/1996 |
| EP | 0 817 485 A1 | 1/1998 |
| EP | 0971324 | 1/2000 |
| EP | 1 318 488 A2 | 6/2003 |
| FR | 2 083 960 A | 12/1971 |
| WO | WO 98/09257 | 3/1998 |
| WO | WO 98/39743 | 9/1998 |
| WO | WO 99/40549 | 8/1999 |
| WO | WO 00/25278 | 5/2000 |

OTHER PUBLICATIONS

International Search Report (PCT/ISA/210) English and French.
Written Opinion of PCT/IB2004/050185 in French.

* cited by examiner

*Primary Examiner*—Gilberto Barron, Jr.
*Assistant Examiner*—Abdulhakim Nobahar
(74) *Attorney, Agent, or Firm*—Harness, Dickey & Pierce, P.L.C.

(57) ABSTRACT

This invention concerns a security module deactivation and reactivation method particularly intended for access control of conditional access data. These security modules include a plurality of registers (R1, R2, R3, Rn) containing values. The method includes the step of sending at least one management message (RUN-EMM) containing an executable code, this executable code being loaded into a memory of the security module and then executed. The execution of this code in particular can carry out the combination and/or the enciphering of the values of the registers, or render these values illegible.

This method also allows the reactivation of the security modules that have been deactivated previously. In this case, the method includes the step of sending another message containing an executable code (RUN-EMM$^{-1}$) for the reactivation of the modules, this executable code having an inverted function to that of the executable code used for the deactivation of the security modules.

9 Claims, 1 Drawing Sheet

METHOD FOR DEACTIVATING AND REACTIVATING SECURITY MODULES

The present invention concerns a method for deactivating and reactivating security modules particularly intended for access control to conditional access data, this method allowing the replacement of a security module, made for example in the form of a chip card, with a new security module during an update.

Particularly in the field of Pay-TV, security modules include three different protagonists, who each have different rights and means for transferring or using these rights. These protagonists are the user, the operator and the manufacturer of the security module.

The user can acquire rights connected to an event or group of events proposed by the operator. Once these rights have been acquired, either by a subscription or by an impulse purchase, these rights are loaded into the user's security module by management messages (EMM). When the receiver receives an enciphered content corresponding to an event whose rights have been acquired, the security module gives the receiver the necessary means to decipher the content. The event can thus be displayed in clear.

If the rights are not present in the security module, the control-words being used to encipher the contents corresponding to the event are not sent back to the decoder by the security module and the event cannot be displayed in clear.

The second protagonist mentioned above, the operator has rights connected to the events that he wishes to broadcast and cryptographic means. These cryptographic means are used to encipher the contents of the events to broadcast in such a way that only the users who have acquired the rights can see the event in clear. Usually, the content to transmit is enciphered by means of control-words that are changed at regular intervals to prevent the deciphering of a control word that could be used to visualize an important part of the event that has been enciphered with said control word.

As it is known, these control-words are transmitted to users in a stream of control messages (ECM) independent on the stream of the content corresponding to the events.

The third protagonist is the security module supplier. The supplier has rights that are not connected to the events like the operator, but connected to the security module management. He also has cryptographic means with a particularly high security level. In fact, if the security of the security modules is broken, it will be easy to use counterfeited security modules, which will invariably answer in the affirmative when the decoder asks whether the rights associated to a particular event are included in the security module. In this case, the operator will not be able to sell any more rights associated to the events that he proposes to broadcast.

For these different reasons, it is recommended that the number of entities having access to high level functions related to security is limited to a minimum.

However, in practice the operator may need to accede to certain high level functions related to the entire set of security module parameters. In particular, this occurs when new security modules must be implemented, especially due to an update of the modules.

Currently, during such an update, users receive a new security module, for example by mail, and have a certain time to withdraw the old security module, to destroy it or to send it back to the supplier and replace it with the new one.

From the point of view of the module supplier, two approaches can be used for these replacements. One of these consists in introducing a predetermined value in a register, so as to indicate that the card must not be used any longer, the other approach consists in deleting all the values in the registers.

In the first approach consisting in changing a value in a register, a command is sent to the security module. A managing center transmits this command as a secured management message (EMM). The message can be sent individually to each user, or to one or several groups of users or to all the users. The aim of this message is to write in a specific memory section that the security module is no longer valid. This writing is realized without taking into account the prior content of the registers of the security modules. The value indicated in this memory section is thus independent from the initial content of the security module's registers. The internal software of said module will verify this value each start and remain in stand-by mode if this value indicates that the module is invalid. This approach presents the advantage that in the case of any updating problem it is possible to send a new message, which changes the predetermined value again in the concerned register, in order to reactivate the card. The disadvantage of this approach is the fact that it is possible for a person who knows the structure of the data registers included in the security module to modify the value of data in the appropriate register and to reactivate the security module. Therefore, two security modules can coexist, which is undesirable.

The second approach consists in deleting all the values in the registers, and thus the rights, and is carried out by means of a command also included in a management message, this message being enciphered. This command activates software which is present in the security module and that was introduced during manufacturing. This approach has the advantage that once the command has been transmitted and received by the security module, it is not possible to reactivate the card by acting on a value in one of the registers. This prevents any non-authorized use of the card. The disadvantage is that it also prevents the card being activated by the operator or the supplier of the security modules, which can be desirable in the case of any updating problem.

The present invention intends to avoid the drawbacks of the processes of the prior art by carrying out a security module update process in which it is particularly difficult to reactivate, without authorization, a module previously deactivated, while also offering the possibility of reactivating said module by means of the authorized protagonists. Furthermore, the operator and/or the module supplier can carry out the reactivation of previously deactivated modules without the security held by the supplier being transferred to the operator.

This aim is reached by a method for deactivating and reactivating security modules particularly intended for access control to conditional access data, the security module including a plurality of registers containing values, this process including a step of sending, by an operator, at least one management message containing an executable code, said executable code being loaded into a memory of the security module and then executed, this method being characterized in that its execution modifies in a reversible way said values contained in the registers, the content of the registers after modification rendering the module unusable.

This invention and its advantages will be better understood in reference to the description of different embodiments and the appended drawings where:

Figure 1:
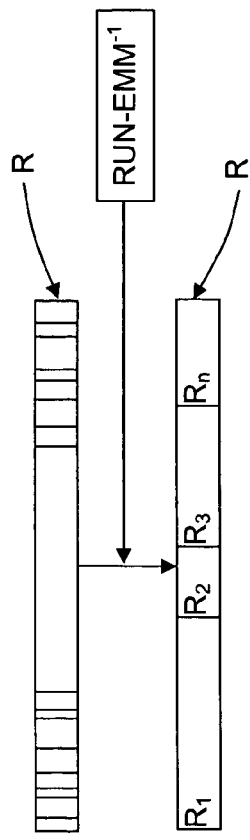
FIG. 1 represents a first embodiment of the method according to the invention where a security module is deactivated.

In the first embodiment of the method according to the invention, the security modules can be simultaneously or batch deactivated. In the description of this embodiment, there is no difference between a simultaneous and a batch deactivation. This first embodiment shows a way to deactivate and reactivate a security module in the case of an update problem, regardless of neither the number of modules to be treated nor the time delay for the processing of these modules.

In the method according to the invention, when an update of a security module or a group of modules is desired, a managing center sends a particular management message to this group of modules. This management message contains an executable code (RUN-EMM).

This code is loaded into a memory in the security module and acts on its registers R1, R2, R3, Rn and on the values of data contained in these registers or on the way of reading these values, so as to modify this data in a way known by the operator and/or by the supplier of the modules. In order to do this, different ways of modifying the data can be conceived. Data contained in the registers can be enciphered by means of a symmetrical or asymmetrical enciphering key; it is possible to scramble the registers by means of simple functions (Exclusive OR, offset, . . . ); it is possible to mix the contents of several registers. It is also possible, without changing the data or the content of the registers, to render their reading impossible by enciphering or by scrambling pointers in an allocation table. It is also possible to send an executable code to replace essential elements of the security module. These essential elements could for example concern the reading capacity of control messages (ECM). However, certain essential elements should not be modified, since without them it would be impossible to reactivate the deactivated modules. Such elements are for example the data handling capacity of management messages (EMM). Of course, a combination of these different techniques can also be provided.

The executable program or code does not therefore act only on a value of a determined register, but on several values of several registers. On the contrary to the prior art's method such as described previously, there is no predefined value that is imposed in the registers. The value of the registers after scrambling or encryption directly depends on the content of these registers before scrambling or encryption. It should be noted that all data contained in the registers remains in the security module, but has been subjected to modifications that render the module unusable. For practical reasons, this alteration of the memory will be accompanied by the entry of this invalidation in a register in order to prevent the module processing the altered data as valid data. The executable code can also be ended by the deletion of this code from the security module memory, so that once the code has been executed, it does not exist anymore in the module or at least a part of this code no longer exists. According to a practical but not obligatory embodiment, the executable code can work together with one or more program elements memorized in the security module, so that the executable code and these program elements must be present to be able to carry out the updating of the module. These program elements can for example be used for writing in the memory, deleting a part of the memory, etc.

By acting as previously described, even if the register structure of the module is known, the reactivation of a deactivated module will not be possible if the executable code used for scrambling or enciphering is not available. The scrambling is disclosed schematically in FIG. 1. It should be noted that the executable code can comprise a part sent by a managing center, as previously mentioned, and another part that is memorized in the security module, these two parts should work together to carry out the deactivation of the modules. The analysis of the part of the executable code memorized in the security module does not allow the part of the sent executable code to be deduced. It is thus not possible to reactivate without authorization a previously deactivated module.

Figure 2:
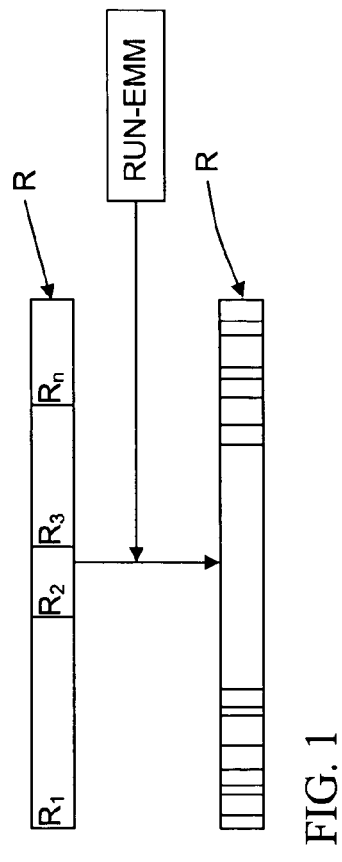
FIG. 2 represents an embodiment of the method where the deactivated module disclosed in FIG. 1 is reactivated.

FIG. 2 shows a case in which it is desirable to reactivate a part or all of the security modules that have been deactivated according to the method described in reference to FIG. 1. This can be desirable, for example, when a problem appears while updating the modules. In this case, the managing center sends to the module or to the group of modules, that are to be reactivated, an executable code (RUN-EMM$^{-1}$) with an inverted action to that of the code sent previously. This new code has the function to modify the register values previously processed by the executable code used for scrambling or enciphering, so as to unscramble or decipher the security module register values and thus render this module usable again. This reactivation can be performed in all the modules belonging to a determined group or just in some of them. It is evident that it can be carried out only when the executable code, allowing the unscrambling or decoding, is available.

This method presents different advantages in relation to the processes in the prior art. On the one hand, it is reversible, which means that if for any reason the reactivation of the security modules of a determined group is desired it can be carried out easily. On the other hand, it offers very good security since without knowing the code that allows unscrambling it is not possible to reactivate a deactivated module.

The method described above can be applied both by the operator and by the security module supplier. However, since the level of security must be notably high during this operation, it may be preferable for the security module supplier to be responsible for the method.

In the following description, the embodiments described in the method according to the invention take into account requirements related to a number of security modules to be processed, to the bandwidth available and to the time required for processing these modules.

In fact, it is evident that to change a large number of security modules, it is not possible to send a message containing an executable code for each module. In fact, for the update to be effective, it is necessary to broadcast the updating messages during a long period of time, for example a year. On the contrary, it is desirable to be able to broadcast only one message to all the modules to be updated or at least the majority of them.

First, the security modules are divided in groups, these groups being defined, for example, by the manufacturing date of the security module and their correspondence to a subscriber's group or to part of a group where a security module change is desired.

Figure 3:
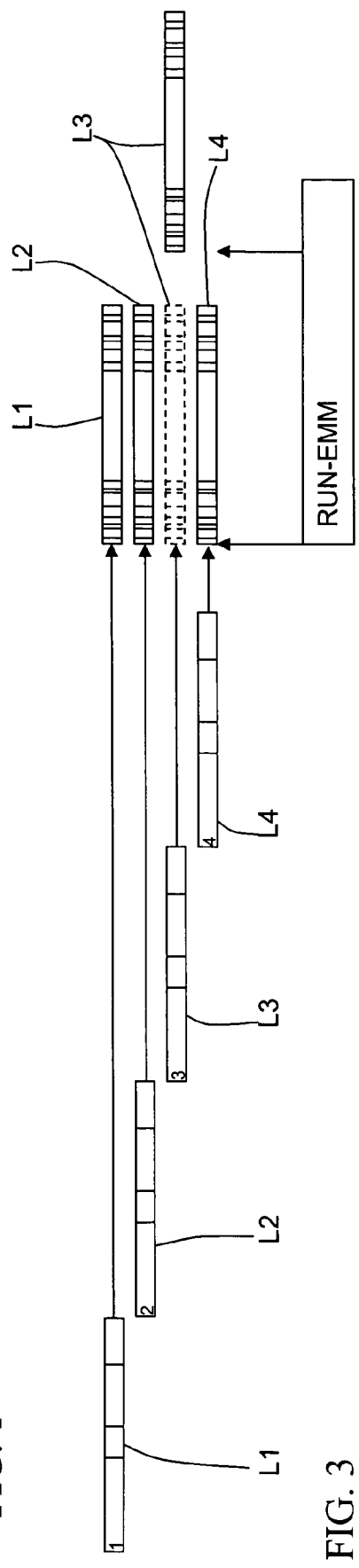
FIG. 3 shows schematically the deactivation of several groups of security modules according to the process of the invention.

As an example, it is possible to separate the group of people who will receive a new security module into 4 groups, named L1 to L4, as schematically represented in FIG. 3. Each group receives a management message containing, in the form of a specific marker, the group number L1, L2, L3 or L4 to which it belongs. This message can be sent during a relatively long period of time, for example 6 months to a year, in order to be sure that all the users have received the message. The marker is a particular value introduced into one of the registers provided for that purpose in the security module. The management messages containing the marker can be sent to all the security modules simultaneously or alternatively to one group at a time, in particular depending on the number of modules to be processed and the bandwidth available. An advantageous embodiment consists in sending the management message to one group at a time at regular intervals, for example each week. It should be noted that by default, each security module could contain a marker whose value is zero. When it is specified that the module has received a message containing a marker, it must be understood that this marker has a value that is not zero, except if it is explicitly specified.

After some time, when it is probable that the majority of security modules of all the groups have received the marker, the module supplier sends an executable code RUN-EMM, as previously described according to FIG. 1. This code first verifies the content of the register containing the marker, in order to verify if the security module belongs to one of the groups where an update must be carried out. According to a particular embodiment, the content of the marker register may be zero in the normal state of use, that is to say when no updating is planed, and higher than zero when an updating is planed and the module has thus received a marker. In this case, the executable code is executed by all the security modules whose marker is strictly higher than zero, that is to say by all the modules which have received and processed a management message containing a marker. As described above, this code has the effect of scrambling or enciphering the contents of the different registers of the security module in order to render it unusable for anyone without the unscrambling or deciphering code at disposal.

This executable code RUN-EMM can be sent regularly during a very long period of time, so that it will act on all the security modules containing a marker, as previously defined. Therefore, if a security module containing a marker is withdrawn from the decoder to which it is connected, it will be deactivated if it is reintroduced into the decoder.

According to an embodiment, instead of executing the code in all the modules whose marker is higher than zero, it is also possible to execute the code only in the security modules in which the marker has a determined value, for example 3. In this case, each group of security modules is processed independently, which allows better flexibility for the updating of modules, but requires a more complex management of messages containing the executable code.

The sending of the messages containing the executable code and thus the security associated to it is managed by the supplier. As for the operator, he manages the sending of messages containing the markers and informs the supplier about the time when the messages containing the executable code can begin to be sent.

Figure 4:
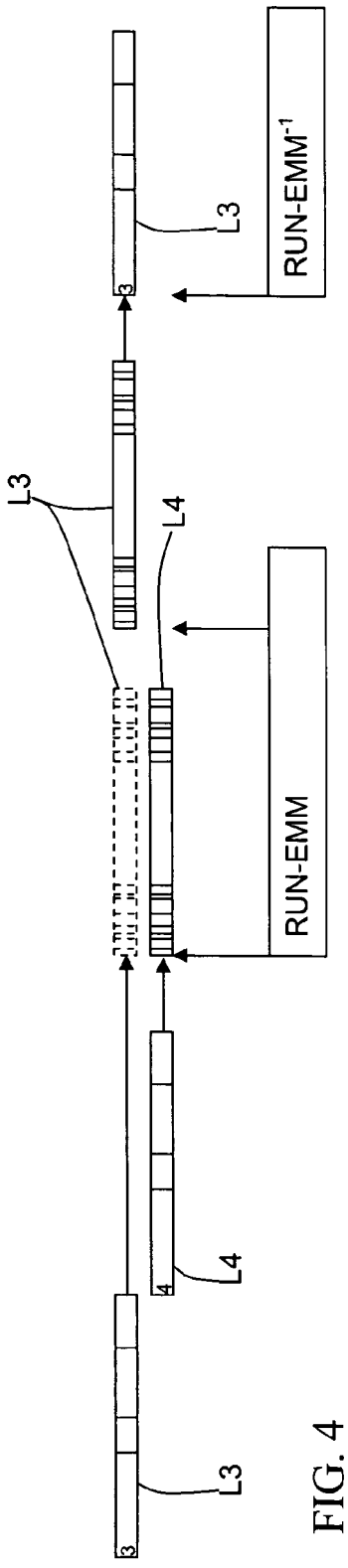
FIG. 4 shows the reactivation of the security modules of a group among those that have been deactivated according to the method schematically disclosed in FIG. 3.

When the security modules of a group must be reactivated, for example due to an incorrect update, two variants are possible. In the first variant, a determined group is reactivated. As an example, the group number 3 in FIG. 4 is reactivated after having been deactivated as previously described. In this case, when the group to be reactivated is identified by means of its marker, the security module supplier sends an executable code similar to that described according to FIG. 2, which acts to unscramble the registers and the values of the module. In order to do this, this executable code first determines the value of the marker in the security modules. It then compares this value to that of the group of modules on which it must act. If this value is identical to the marker, the code is executed and the registers are unscrambled. The security modules in question are therefore reactivated. The modules in which the marker has a value different to the value of the group to be reactivated remain deactivated and thus unusable.

In a variant of this method, the reactivation does not act on a predetermined group, but on all the security modules presenting a determined characteristic. When a module or a group of modules must be reactivated, the operator first sends a message containing a predetermined marker, having for example a value of −1. This marker replaces the marker previously contained in the concerned module.

In this case, the supplier then sends a message containing an executable code as previously defined, which acts to unscramble the values and the registers of the security modules that have a marker with a value of −1. A message of this type can be sent regularly by the security module supplier. As for the operator, he can send the messages modifying the value of the marker so that they have the value of −1. Therefore, the operator himself can manage the reactivation of security modules, independently of the module supplier, without it being necessary for the latter to transmit the particularly confidential cryptographic data to the operator.

This method presents a certain number of advantages in relation to the processes in the prior art. In fact, in these processes the security module contains a program that allows the value of a predefined register to be changed thus activating or deactivating the module. In this case, a detailed analysis of the module allows the effects of the program to be known and thus the eventual simulation of the program. Furthermore, since the program is memorized in the module, it can only act as foreseen during the manufacturing of the module. Therefore, it does not present any possibility of evolution. In the method according to the invention, the sending of the executable code at the moment of use prevents an analysis of the contents and allows a code to be sent that corresponds to the real application at that moment, which can thus evolve in an important way depending on the requirements.

The invention claimed is:

1. A method for deactivating and reactivating security modules intended for accessing control to conditional access data, the security module including a plurality of registers ($R_1$, $R_2$, $R_3$, $R_n$) containing values, the method comprising:
sending, by an operator, at least one management message containing an executable code (RUN-EMM), said executable code being loaded into a memory of the security module,
reading the values contained in at least two registers, and
modifying the values contained in said at least two registers using a scrambling code, said modification being done in a reversible way such that the initial values contained in said at least two registers are obtained by applying a descrambling code on the modified values and in which a result of the modification depends at least one of the initial values that were read in the registers,
wherein the content of the registers after modification of the values renders the module unusable.

2. The method according to claim 1, wherein said executable code (RUN-EMM) mixes said values included in the registers ($R_1$, $R_2$, $R_3$, $R_n$).

3. The method according to claim 1, wherein said executable code (RUN-EMM) enciphers said values contained in the registers ($R_1$, $R_2$, $R_3$, $R_n$).

4. The method according to claim 1, further comprising
sending messages containing a marker, said marker being common to a determined group of security modules and being different for each group.

5. The method according to claim 4, wherein said executable code (RUN-EMM) acts on all the security modules containing the marker.

6. The method according to claim 4, wherein said executable code (RUN-EMM) acts on all the security modules with the marker having a determined value.

7. The method according to claim 1, further comprising sending another message containing another executable code (RUN-EMM$^{-1}$) for the reactivation of the modules, said another executable code (RUN-EMM$^{-1}$) having an inverted function to that of the executable code (RUN-EMM) used for the deactivation of the security modules.

8. The method according to claim 1, wherein the security modules contain a marker, and includes determining the value of the marker in each security module and sending at least one message containing another executable reactivation code (RUN-EMM$^{-1}$), said another executable code (RUN-EMM$^{-1}$) having an inverted function to that of the executable code (RUN-EMM) used for the deactivation of the security modules, said executable code being executed in all the security modules having the marker whose value is predetermined.

9. The method according to claim 1, further comprising
sending a message for modifying the value of a marker, said message acting on all the security modules having the marker with a predetermined value, so that the marker has a unique predetermined reference value, and further includes sending at least one message containing another executable code (RUN-EMM$^{-1}$), said another executable code (RUN-EMM$^{-1}$) having an inverted function to that of the executable code (RUN-EMM) used for the deactivation of the security modules, said executable code being executed in all the security modules having the marker with the predetermined reference value.

* * * * *

UNITED STATES PATENT AND TRADEMARK OFFICE
CERTIFICATE OF CORRECTION

PATENT NO. : 7,890,770 B2  
APPLICATION NO. : 11/212904  
DATED : February 15, 2011  
INVENTOR(S) : Kudelski et al.

Page 1 of 1

It is certified that error appears in the above-identified patent and that said Letters Patent is hereby corrected as shown below:

On title page please add:

Related U.S. Application Data

(63)   Continuation-in-part of application No. PCT/IB2004/050185 filed on March 2, 2004

Foreign Application Priority Data

(30)   March 3, 2003 (CH).............CH 00325/03

Signed and Sealed this  
Tenth Day of May, 2011

David J. Kappos  
*Director of the United States Patent and Trademark Office*